(12) United States Patent
Kim

(10) Patent No.: US 11,112,061 B2
(45) Date of Patent: Sep. 7, 2021

(54) WATER DETECTOR OF DOUBLE STRUCTURE WITH FREEZE PROTECTION

(71) Applicant: Solge Corporation, Daegu (KR)

(72) Inventor: Tae Heon Kim, Daegu (KR)

(73) Assignee: SOLGE CORPORATION, Daegu (KR)

( * ) Notice: Subject to any disclaimer, the term of this patent is extended or adjusted under 35 U.S.C. 154(b) by 363 days.

(21) Appl. No.: 16/384,933

(22) Filed: Apr. 16, 2019

(65) Prior Publication Data
US 2020/0300411 A1 Sep. 24, 2020

(30) Foreign Application Priority Data
Mar. 20, 2019 (KR) .................. 10-2019-0031957

(51) Int. Cl.
| | | |
|---|---|---|
| *B01D 17/032* | (2006.01) | |
| *F16N 39/00* | (2006.01) | |
| *B01D 17/02* | (2006.01) | |

(52) U.S. Cl.
CPC .......... *F16N 39/00* (2013.01); *B01D 17/0214* (2013.01); *F16N 2200/20* (2013.01)

(58) Field of Classification Search
CPC ... B01D 17/0208; B01D 17/0214; C02F 1/40; F16N 39/00; F16N 2200/20
USPC .... 210/94, 172.1, 521, 532.1, 538, 539, 540
See application file for complete search history.

(56) References Cited

U.S. PATENT DOCUMENTS

| | | | | |
|---|---|---|---|---|
| 700,056 A | * | 5/1902 | Kremer ............... | C02F 3/28 210/538 |
| 1,200,951 A | * | 10/1916 | Kelly ............... | B01D 17/0214 210/540 |
| 2,625,268 A | * | 1/1953 | Hatfield, Jr. .......... | B60K 15/00 210/172.1 |
| 2,762,511 A | * | 9/1956 | Sternaman ........... | B08B 9/0933 210/532.1 |
| 3,362,542 A | * | 1/1968 | Stevens ............... | E03B 3/16 210/521 |
| 4,371,437 A | * | 2/1983 | Iwasaki ............... | B01D 21/02 210/172.1 |
| 5,993,676 A | * | 11/1999 | Lowery, Jr. ........ | B01D 17/0208 210/532.1 |
| 7,367,459 B2 | * | 5/2008 | Batten ............... | B01D 17/0214 210/521 |
| 7,368,060 B2 | * | 5/2008 | Faxides ............... | B01D 35/143 210/86 |

FOREIGN PATENT DOCUMENTS

KR 101883725 B1 8/2018

* cited by examiner

*Primary Examiner* — Christopher Upton
(74) *Attorney, Agent, or Firm* — Cantor Colburn LLP

(57) ABSTRACT

According to an embodiment of the present disclosure, a water detector of a double structure with a freeze protection function is disclosed. The water detector includes: an external body including a container-shaped structure which has an empty space formed therein, and includes a side surface portion, an upper portion, and a lower portion; and an internal body which is inserted into an inside of the external body and coupled thereto, the internal body including a container-shaped structure which has an empty space formed therein, and includes a side surface portion, an upper portion, and a lower portion.

10 Claims, 20 Drawing Sheets

< Internal Body >

< Internal Body >

< Internal Body >

< Internal Body >

< External Body >

< External Body >

< External Body >

< Locking Structure of External Body and Internal Body >

WATER DETECTOR OF DOUBLE STRUCTURE WITH FREEZE PROTECTION

CROSS-REFERENCE TO RELATED PATENT APPLICATION

This application is based on and claims priority under 35 U.S.C. § 119 to Korean Patent Application No. 10-2019-0031957 filed on Mar. 20, 2019 in the Korean Intellectual Property Office, the disclosure of which is herein incorporated by reference in its entirety.

BACKGROUND

1. Field

The present disclosure relates to a water detector of a double structure with a freeze protection function.

2. Description of the Related Art

It is common that, in a fluid storage tank using oil such as a lubricant, a flow of air is generated due to a change in the volume of an upper portion caused by the flow of the lubricant in the tank, and a change in the volume caused by a change in temperature, and air generated in this way may contain many pollutants (pollution particles and moisture). Pollutants contained in the lubricant may cause an irretrievable breakdown in facilities, and may quickly reduce the lifespan of the lubricant. Therefore, there is a need to prevent pollutants (moisture and particles) from entering a facility system. The function of managing lubricants cleanly and dryly by removing moisture already permeating the lubricants is an important factor in preventing a breakdown and deterioration of facilities.

In an industrial site, a bleeder may be installed and used in a fluid storage tank to prevent pollution of a lubricant, which may cause a breakdown of facilities, and to remove moisture, and also, a water detector may be installed and used on a bottom of a fluid storage tank to collect and discharge moisture. A related-art water detector is disclosed in Korean Patent Registration No. 10-1883725 (titled "Water Detector of a Freeze-Proof Type").

SUMMARY

According to an embodiment of the present disclosure, there is provided a water detector of a double structure with a freeze protection function, which can be mass produced.

According to another embodiment of the present disclosure, there is provided a water detector of a double structure with a freeze protection function, which does not require complicated components such as a spring or cylinder.

According to still another embodiment of the present disclosure, there is provided a water detector of a double structure with a freeze protection function, which can be used for both horizontal coupling and vertical coupling with changing its structure.

According to an embodiment of the present disclosure, a water detector of a double structure with a freeze protection function includes: an external body including a container-shaped structure which has an empty space formed therein, and includes a side surface portion, an upper portion, and a lower portion; and an internal body which is inserted into an inside of the external body and coupled thereto, the internal body including a container-shaped structure which has an empty space formed therein, and includes a side surface portion, an upper portion, and a lower portion, wherein the lower portion of the structure of the external body and the lower portion of the structure of the internal body are opened, respectively, wherein a casing portion having a fluid inflow and outflow portion formed thereon to allow a fluid to be drawn in from the outside or to be discharged to the outside is coupled to the upper portion of the structure of the external body, and a casing portion having a fluid inflow and outflow portion formed thereon to allow a fluid to be drawn in from the outside or to be discharged to the outside is coupled to the upper portion of the internal body, wherein the lower portion of the structure of the internal body is inserted into the lower portion of the structure of the external body and coupled thereto.

According to one or more embodiments, the water detector can be mass produced by applying a method like an injection molding method.

In addition, according to one or more embodiments, the water detector does not require complicated components such as a spring or cylinder, and can be used for both horizontal coupling and vertical coupling without changing its structure.

In addition, according to one or more embodiments, it can be checked whether metals are contained in a fluid in the water detector with user's naked eyes, and gas generated inside the water detector can be discharged to the outside.

In addition, according to one or more embodiments, the water detector employs the double structure and the notches, thereby effectively preventing freezing and busting

BRIEF DESCRIPTION OF THE DRAWINGS

The above and other features and advantages will become more apparent by describing in detail exemplary embodiments with reference to the attached drawings in which.

DETAILED DESCRIPTION OF EXEMPLARY EMBODIMENTS

Figure 1:
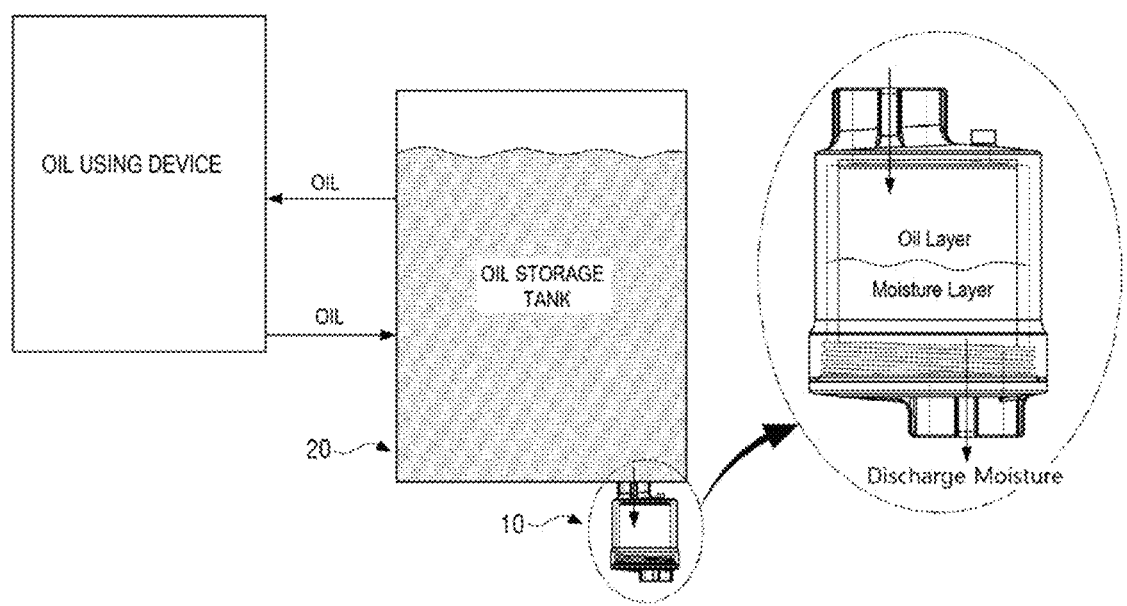
FIG. 1 is a view to illustrate an example of using a water detector of a double structure with a freeze protection function according to an embodiment of the present disclosure.

Exemplary embodiments will now be described more fully with reference to the accompanying drawings to clarify aspects, other aspects, features and advantages of the present disclosure. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the present disclosure to those of ordinary skill in the art.

In the drawings, thicknesses of components are exaggerated or reduced for effective explanation of the technical features.

In the drawings, all of the components are not assigned reference numerals, and some of the components are assigned reference numerals if necessary for easy explanation of the present disclosure.

If the terms such as 'first' and 'second' are used to describe various components, these components should not be limited by such terms. These terms are used for the purpose of distinguishing one component from another component only. The exemplary embodiments explained and illustrated herein include their complementary embodiments.

The expressions such as "upper", "lower", "side surface", "clockwise direction", etc. used in the detailed description to explain a position relationship between components do not mean a direction or location as an absolute criterion, and may be relative expressions used for convenience of explanation with reference to a corresponding drawing when the present disclosure is explained with reference to each drawing.

The terms used in the detailed description are used to explain the embodiments and not to limit the present disclosure. As used herein, the singular forms are intended to include the plural forms as well, unless the context clearly indicates otherwise. It will be further understood that the terms "comprise" and/or "comprising," when used in the detailed description, do not preclude the presence or addition of one or more other components.

Terms

In the detailed description, the term "fluid" refers to gas and a liquid. According to an embodiment, the fluid may include air and oil.

In the detailed description, the term "coupling" includes direct coupling and indirect coupling. The direct coupling may mean that another component is not interposed between components coupled to each other, and the indirect coupling may mean that one or more other components are interposed between components coupled to each other.

In the detailed description, the expression "adjusting a flow" means "blocking a flow," "allowing a flow," or "adjusting an amount of flowing fluid."

In the detailed description, the term "valve" refers to a component capable of adjusting the flow of a fluid, and specifically, refers to a component capable of blocking or allowing the flow of a fluid, or adjusting an amount of flowing fluid, and for example, may include devices like an on-off valve and a control valve.

FIG. 1 is a view to illustrate an example of using a water detector of a double structure with a freeze protection function according to an embodiment of the present disclosure.

Referring to FIG. 1, the water detector 10 of the double structure with the freeze protection function according to an embodiment (hereinafter, referred to as a "water detector") may be coupled to an oil storage tank 20 in a vertical direction (hereinafter, may be referred to as "vertical coupling"), and may be used.

In an embodiment, the oil storage tank 20 provides oil to a device using oil (for example, a turbine), and receives oil from such a device and stores the oil. In FIG. 1, the water detector 10 may be a water detector which will be described with reference to FIGS. 3 to 20.

In an embodiment, oil flowing into the oil storage tank 20 may contain moisture (or water) or metal particles. The oil flowing into the oil storage tank 20 has lower specific gravity than that of moisture, and thus, more moisture is placed under the oil as time passes.

In the detailed description, the term "fluid" refers to any one of the following terms a), b), c), and d) for purpose of explanation, but may refer to all or a part of the following terms a), b), c), and d) if there is no advantage in distinguishing these terms:

a) oil;
b) moisture;
c) oil mixed with moisture; and
d) oil mixed with moisture and metals In the detailed description, the term "vertical coupling" implies that the water detector 10 is coupled to the oil storage tank 20 to receive a fluid through an upper portion of the water detector 10, and the term "horizontal coupling," which will be described below, implies that the water detector 10 is coupled to the oil storage tank 20 to receive a fluid in a direction parallel to the ground surface.

The water detector 10 according to an embodiment uses a difference in specific gravity between oil and water, and is coupled to a lower portion of the oil storage tank 20 to receive a fluid stored in a lower portion of the oil storage tank 20. As will be described below with reference to the other drawings, the water detector 10 according to an embodiment is provided with a hole to receive a fluid, and is coupled to the oil storage tank 20 to receive the fluid stored in the oil storage tank 20 through the hole. When the water detector 10 and the oil storage tank 20 are coupled to each other, the fluid may flow into the water detector 20, and the fluid in the water detector 10 may be substantially divided into a moisture layer and an oil layer as time passes. Since the water detector 10 is provided with a hole to discharge the fluid, moisture in the moisture layer is discharged to the outside through the hole.

Figure 2:
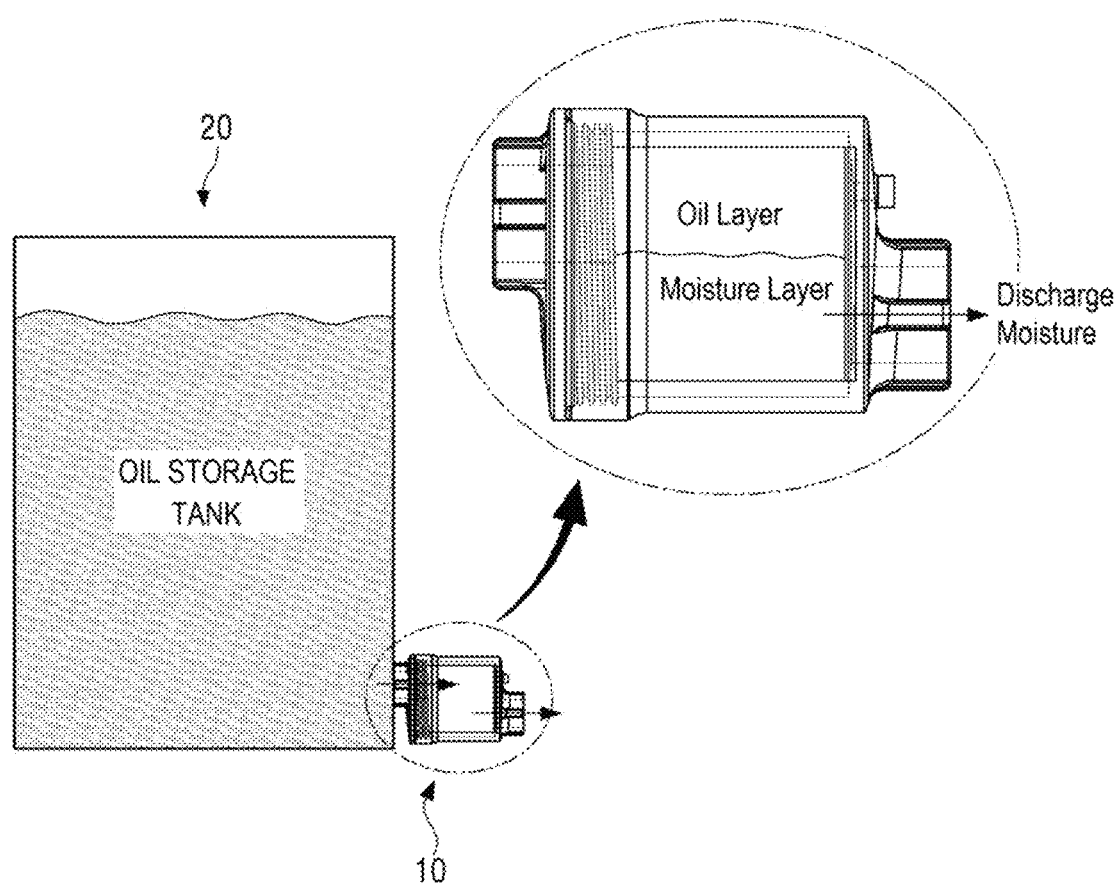
FIG. 2 is a view to illustrate another example of using the water detector of the double structure with the freeze protection function according to an embodiment of the present disclosure.

FIG. 2 is a view to illustrate another example of using the water detector of the double structure with the freeze protection function according to an embodiment.

Referring to FIG. 2, the water detector 10 of the double structure with the freeze protection function according to an embodiment may be coupled to the oil storage tank 20 in a horizontal direction (hereinafter, may be referred to as "horizontal coupling"). Herein, the water detector 10 will be described below with reference to FIGS. 3 to 20.

As described above with reference to FIG. 1, oil flowing into the oil storage tank 20 has lower specific gravity than that of moisture, and thus moisture is placed under the oil as time passes.

The water detector 10 is provided with the hole to receive the fluid, and is coupled to the oil storage tank 20 in the horizontal direction to receive the fluid stored in the oil storage tank 20 through the hole. When the water detector 10 and the oil storage tank 20 are coupled to each other in the horizontal direction, the fluid may flow into the water detector 20. The fluid flowing into the water detector 20 may be substantially divided into a moisture layer and an oil layer as time passes, and the moisture layer is positioned under the oil layer. Since the water detector 10 is provided with the hole to discharge the fluid, moisture of the moisture layer is discharged to the outside through the hole.

Referring to FIGS. 1 and 2, the coupling direction of the water detector 10 coupled in the horizontal direction, and the coupling direction of the water detector 10 coupled in the vertical direction are opposite to each other.

For example, the vertical coupling causes the fluid stored in the oil storage tank 20 to be drawn in through a hole h201 formed on a second casing portion 230 of the water detector 10, and causes the fluid to be discharged to the outside through a hole h101 formed on a first casing portion 130. On the other hand, the horizontal coupling causes the fluid stored in the oil storage tank 20 to be drawn in through the hole h101 formed on the first casing portion 130, and causes the fluid to be discharged to the outside through the hole h201 formed on the second casing portion 230. Herein, the newly mentioned components will be described in detail below with reference to FIGS. 3 to 18. The water detector 10 according to one or more embodiments, which will be described with reference to FIGS. 3 to 18, may be configured to be used for both the vertical coupling and the horizontal coupling.

Figure 3:
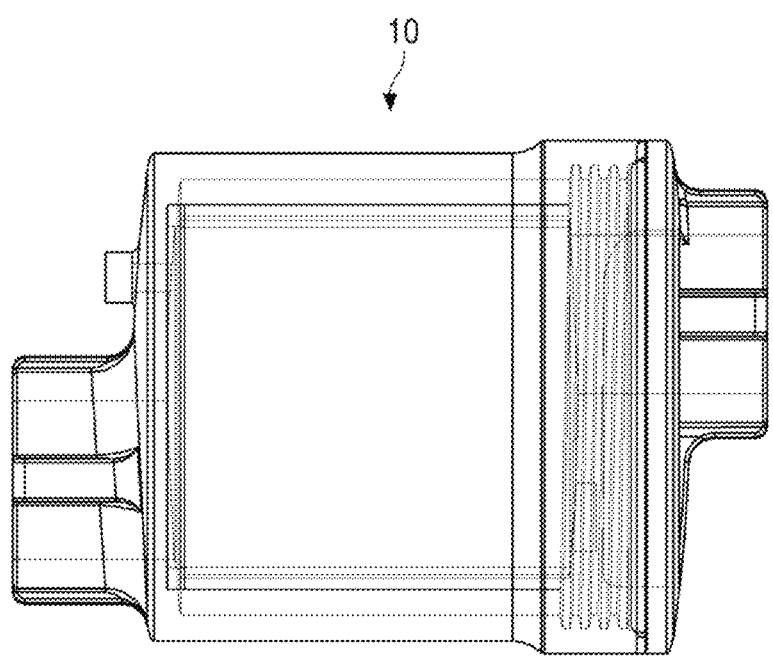
FIGS. 3 and 4 are views to illustrate a structure of the water detector of the double structure with the freeze protection function according to an embodiment of the present disclosure.
Figure 4:
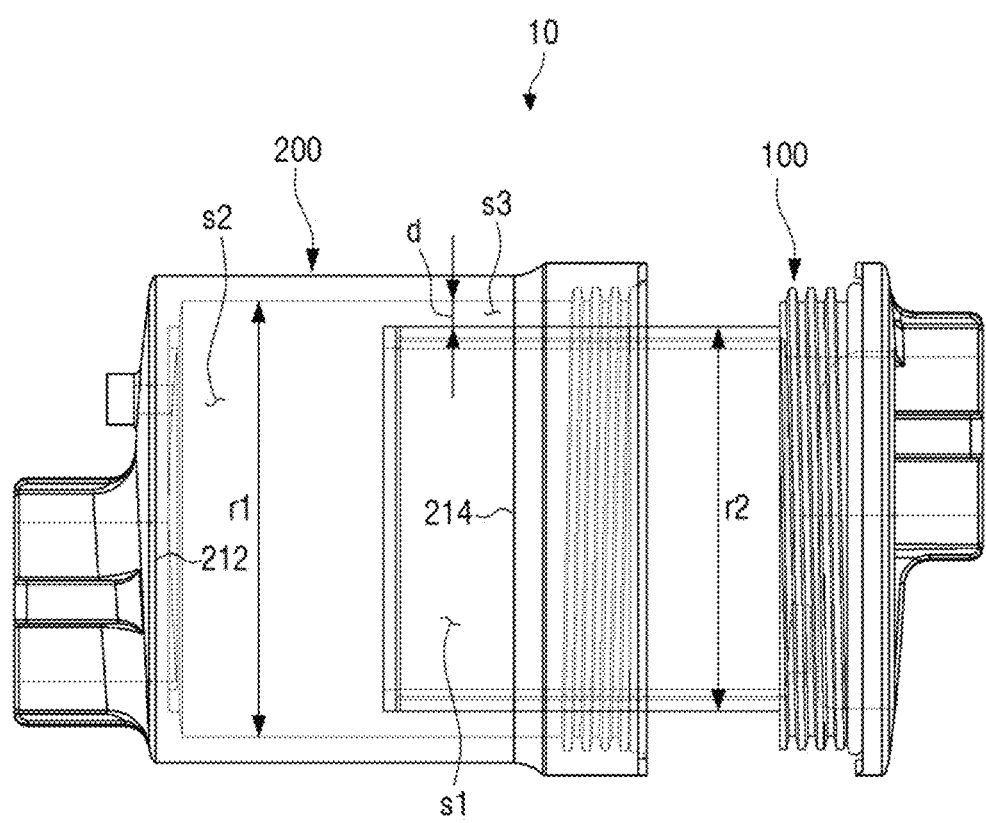
Figure 5:
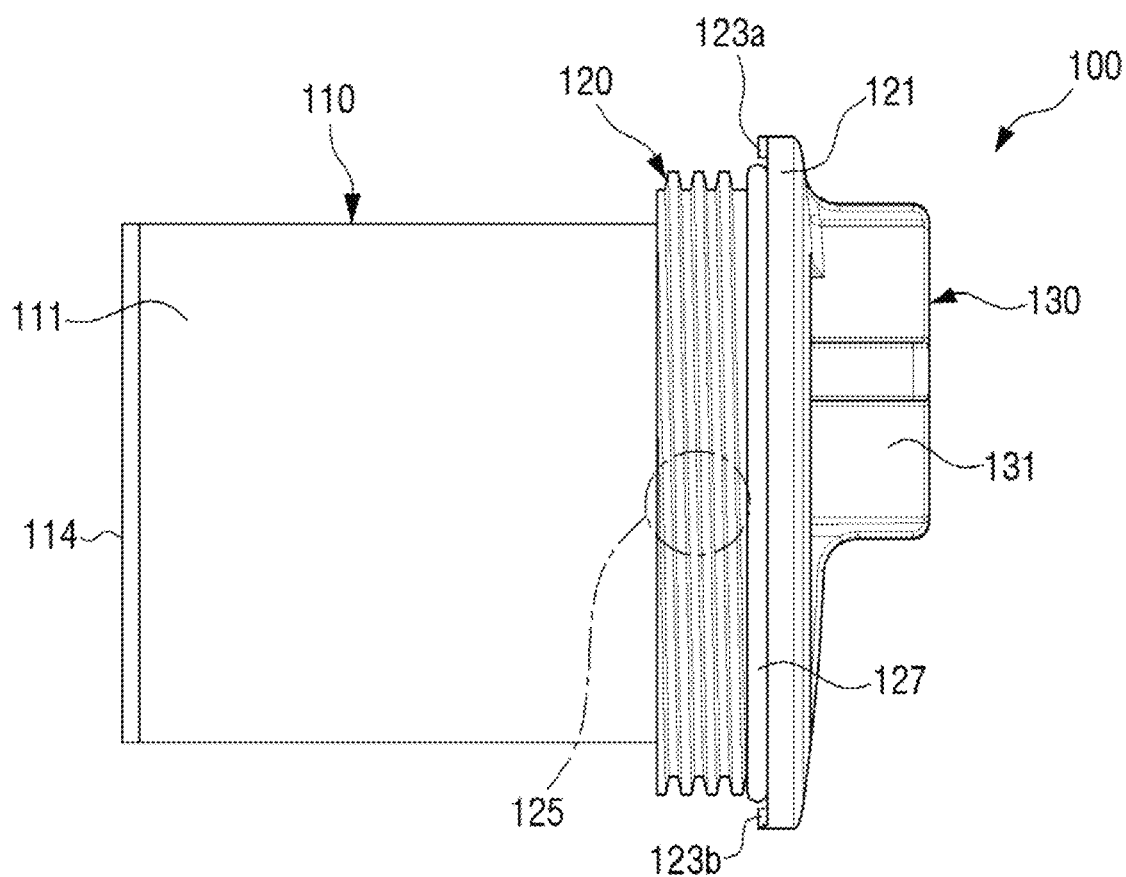
FIGS. 5 to 8 are views to illustrate an internal body of the water detector of the double structure with the freeze protection function according to an embodiment of the present disclosure.
Figure 6:
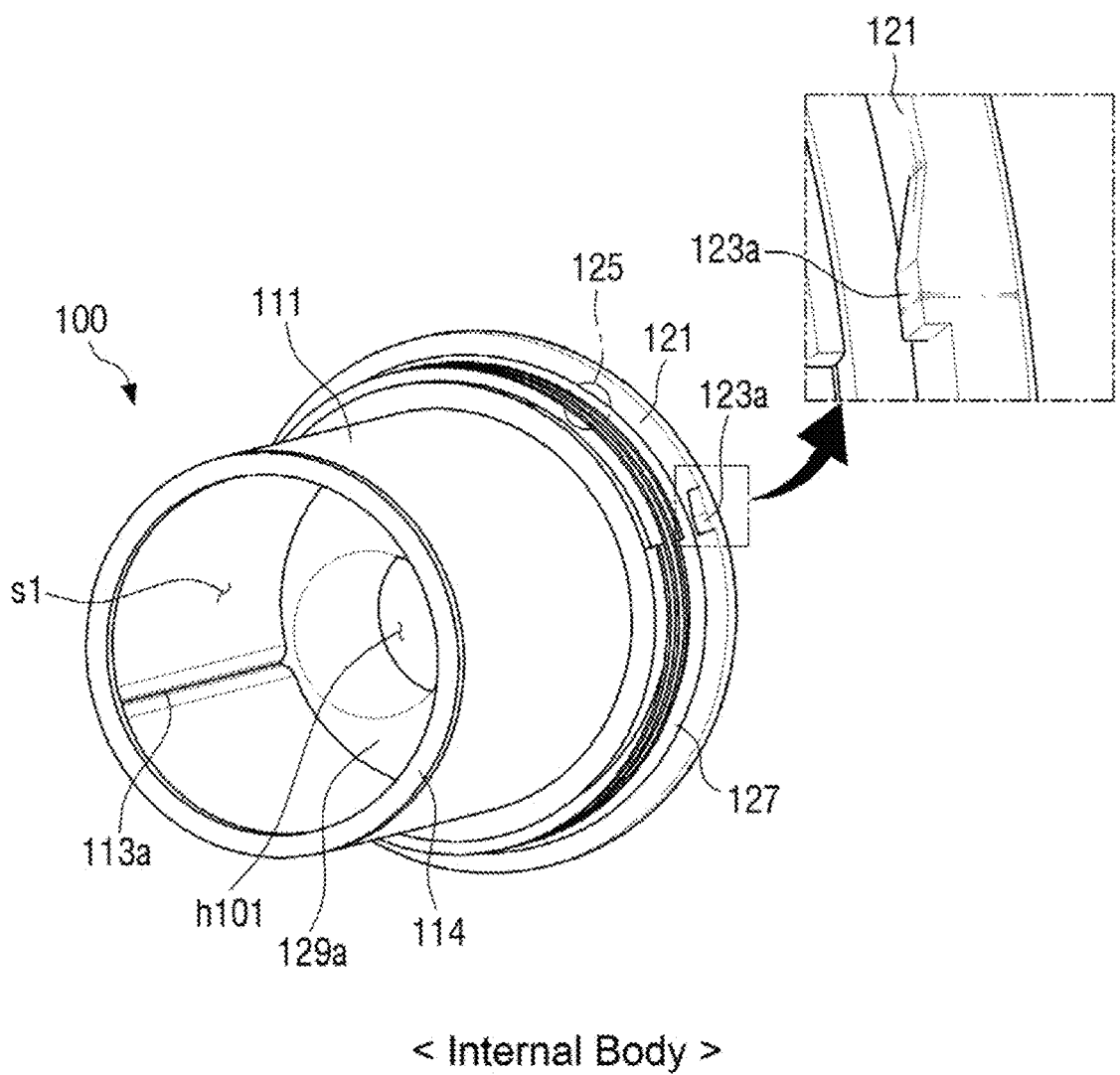
Figure 7:
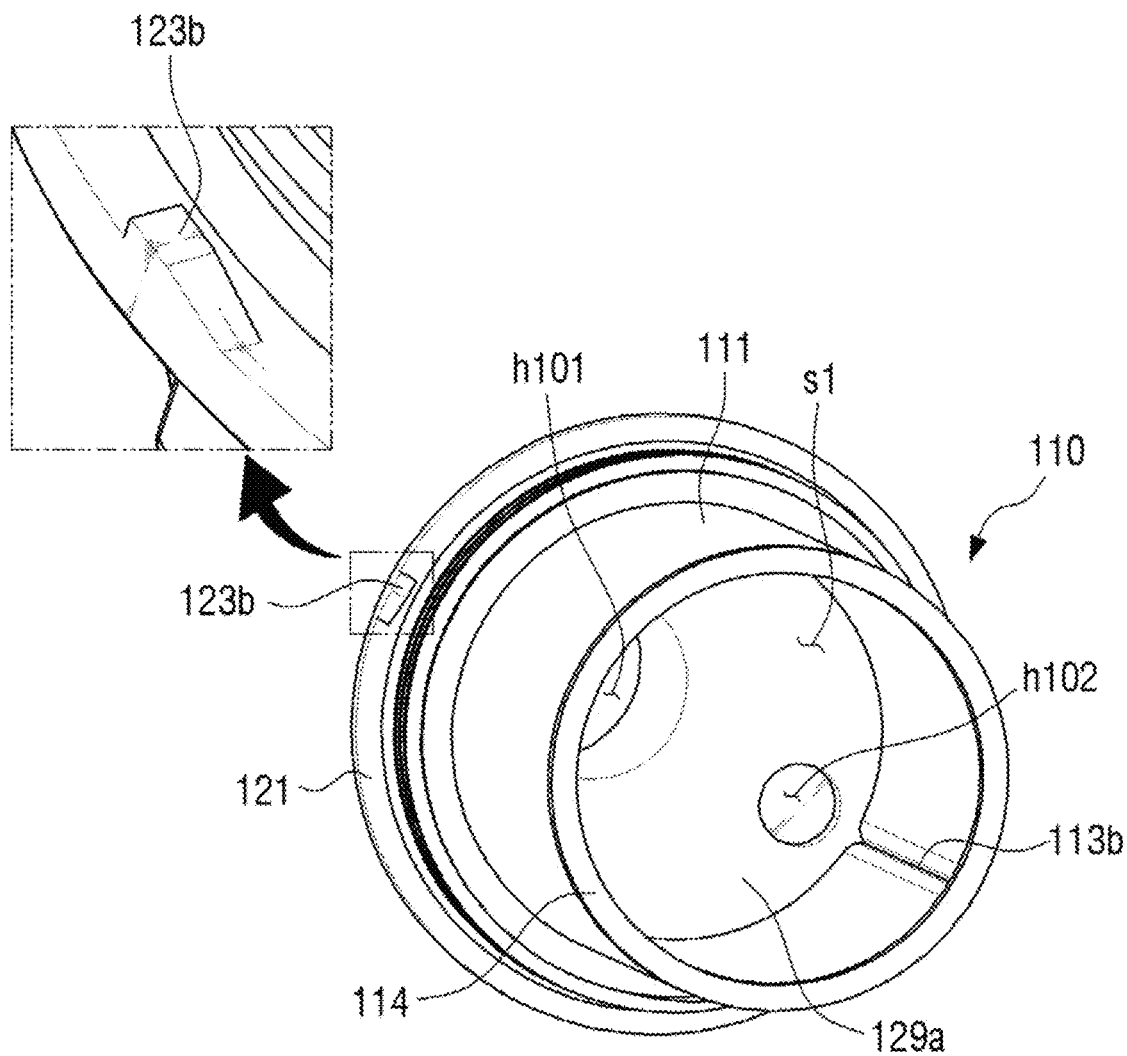
Figure 8:
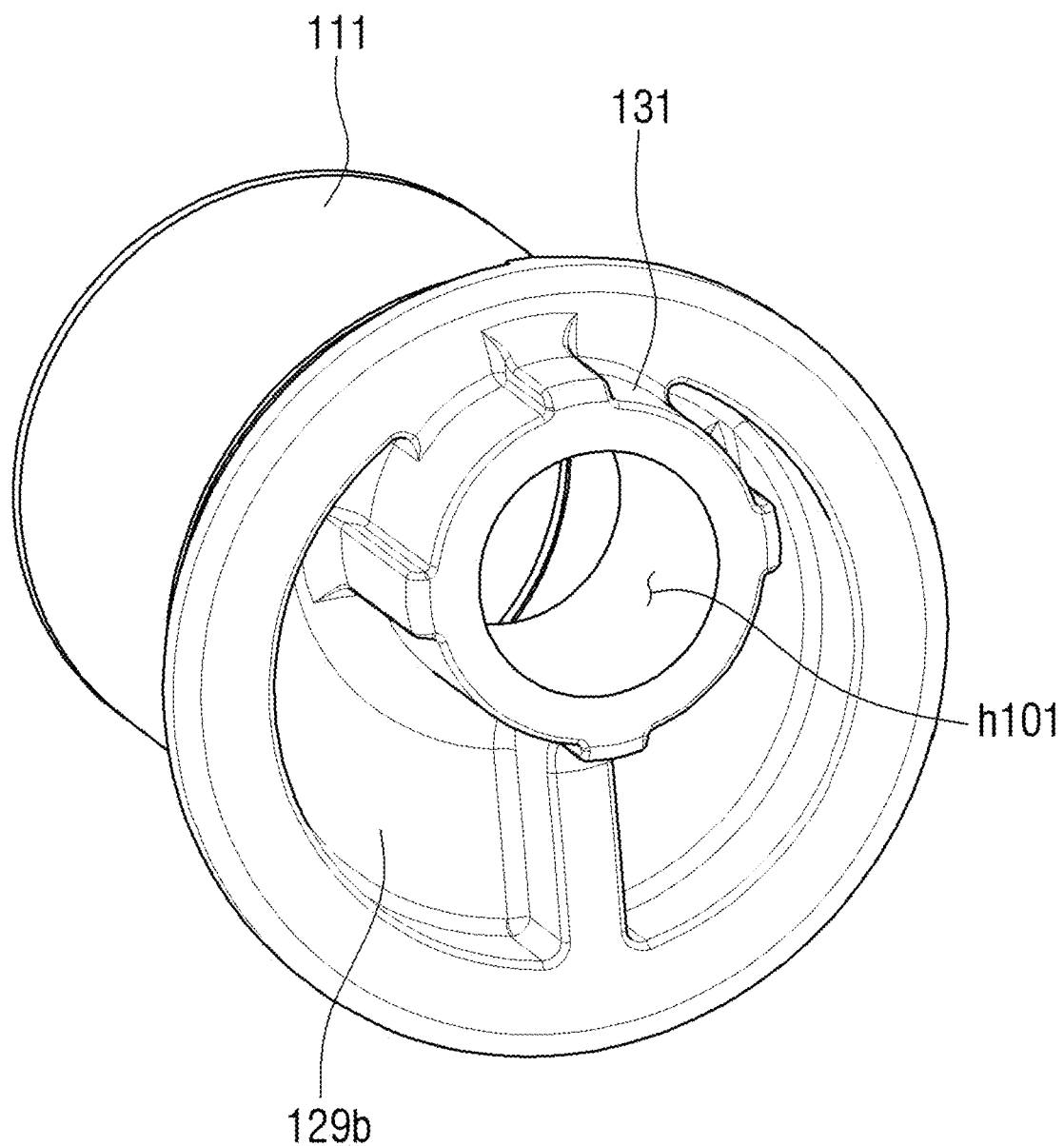

FIGS. 3 and 4 are views to illustrate a structure of the water detector of the double structure with the freeze protection function according to an embodiment.

Referring to FIGS. 3 and 4, the water detector 10 of the double structure with the freeze protection function according to an embodiment may include an internal body 100 and an external body 200. Herein, the internal body 100 may be inserted into and coupled to an inside s2 of the external body 200.

In an embodiment, the internal body 100 and the external body 200 are coupled to each other, being spaced apart from each other by a predetermined distance d. This is to prevent the internal body 100 from damaging the external body 200 since an outer diameter of the internal body 100 increases in a cold environment.

In an embodiment, the internal body 100 and the external body 200 may be formed with a transparent material, such that their interiors can be seen from the outside. For example, an entirety or a part of the internal body 100 may be formed with a material called "copolyester," and an entirety or a part of the external body 200 may also be formed with a material called "copolyester."

FIGS. 5 to 8 are views to illustrate the internal body of the water detector of the double structure with the freeze protection function according to an embodiment. Hereinafter, the internal body 100 will be described in detail with reference to FIGS. 5 to 8.

The internal body 100 may include a structure 110 (referred to as a "first structure 110" for convenience of explanation), a coupling portion 120 (referred to as a "first coupling portion 120" for convenience of explanation), and a casing portion 130 (referred to as a "first casing portion 130" for convenience of explanation). According to an embodiment, the first structure 110, the first coupling portion 120, and the first casing portion 130 may be integrally formed with one another.

The first structure 110 is coupled to the first casing portion 130, the first coupling portion 120 is formed on an exterior of the first casing portion 130, and the first structure 110 is inserted into the inside of the first casing portion 130 and is tightly coupled thereto.

In the detailed description, the expression "tightly being coupled" refers to being coupled to prevent a fluid from being leaked to the outside and from entering from the outside.

The first structure 110 is formed in a container shape, and has an empty space formed in an inside s1 thereof, and includes a side surface portion 111, an upper portion 112, and a lower portion 114. Herein, the side surface portion 111, the upper portion 112, and the lower portion 114 of the first structure 110 are integrally connected with one another.

The first structure 110 may be formed in a cylindrical shape, for example.

The upper portion 112 of the first structure 110 is tightly coupled with the first casing portion 130. As will be described below, a fluid may be drawn in or may be discharged through the hole h101 formed on the first casing portion 130. In an embodiment, the upper portion 112 of the first structure 110 is inserted into the inside of the first casing portion 130 and is tightly coupled thereto.

The lower portion 114 of the first structure 110 is opened, and the internal body 110 and the external body 200 are coupled to each other with the lower portion 114 of the first structure 110 being inserted into the inside s2 of the external body 200.

One or more notches 113a, 113b having a recess shape may be formed on an inner surface of the side surface portion 111. These notches 113a, 113b may be formed along a longitudinal direction of the internal body 100, for example.

For example, when the side surface portion 111 is formed in a cylindrical shape, the notches 113a, 113b may be formed on the inner surface of the side surface portion 111 along the longitudinal direction of the cylinder.

The first casing portion 130 includes a sealing portion 129 (129a, 129b) (hereinafter, referred to as a "first sealing portion 129" for convenience of explanation), and a fluid inflow and outflow portion 131 (hereinafter, referred to as a "first inflow inflow and outflow portion 131" for convenience of explanation) having the hole h101 formed thereon. The sealing portion 129 includes an inner surface 129a and an outer surface 129b. The inner surface 129a is in contact with the inside s1 of the first structure 110, and the outer surface 129b is in contact with the outside.

The first sealing portion 129 is tightly coupled with the upper portion 112 of the first structure 110.

In an embodiment, the fluid inflow and outflow portion 131 may be formed on a position of the first sealing portion 129. The hole h101 formed on the fluid inflow and outflow portion 131 provides a passage to allow the fluid to move between the inside s1 of the first structure 110 and the outside of the water detector 10.

For example, when the first structure 110 is formed in a cylindrical shape, the casing portion 130 may be formed with a cap having a cylindrical shape. In this case, the first structure 110 is coupled to the first casing portion 130 by being tightly inserted into the inside of the cylindrical casing portion 130. The first coupling portion 120 may be formed on the exterior of the first cylindrical casing portion 130 in the circumferential direction.

The first coupling portion 120 may include a locking portion 121 and a fastening portion 125, and the locking portion 121 may have protrusions 123 (123a, 123b) formed thereon. In addition, the locking portion 121 may have an O-ring 127 disposed thereon for tightly coupling.

In an embodiment, the protrusions 123 (123a, 123b) may be formed an end of the locking portion 121 (a portion being brought into contact with a second coupling portion 220 of the external body 200). The protrusions 123 (123a, 123b) have a shape protruding and inclining.

Each of the protrusions 123a, 123b protrudes from a predetermined position of the locking portion 121 as long as a predetermined section with a certain slope, and returns to an original height of the locking portion 121 (that is, a height before protruding) after the predetermined section. For example, the protrusions 123a, 123b may be formed in a right triangle shape.

The locking portion 121 formed on the internal body 100 may have a position and a configuration corresponding to those of a locking portion 221 formed on the external body 200, and the locking portion 121 will be described below with reference to FIGS. 12 and 13.

The fastening portion 125 formed on the internal body 100 may be configured to be engaged with a fastening portion 225 formed on the external body 200 and to be fastened thereto. For example, the fastening portion 125 may have a crest and a root like the shape of a screw.

Figure 9:
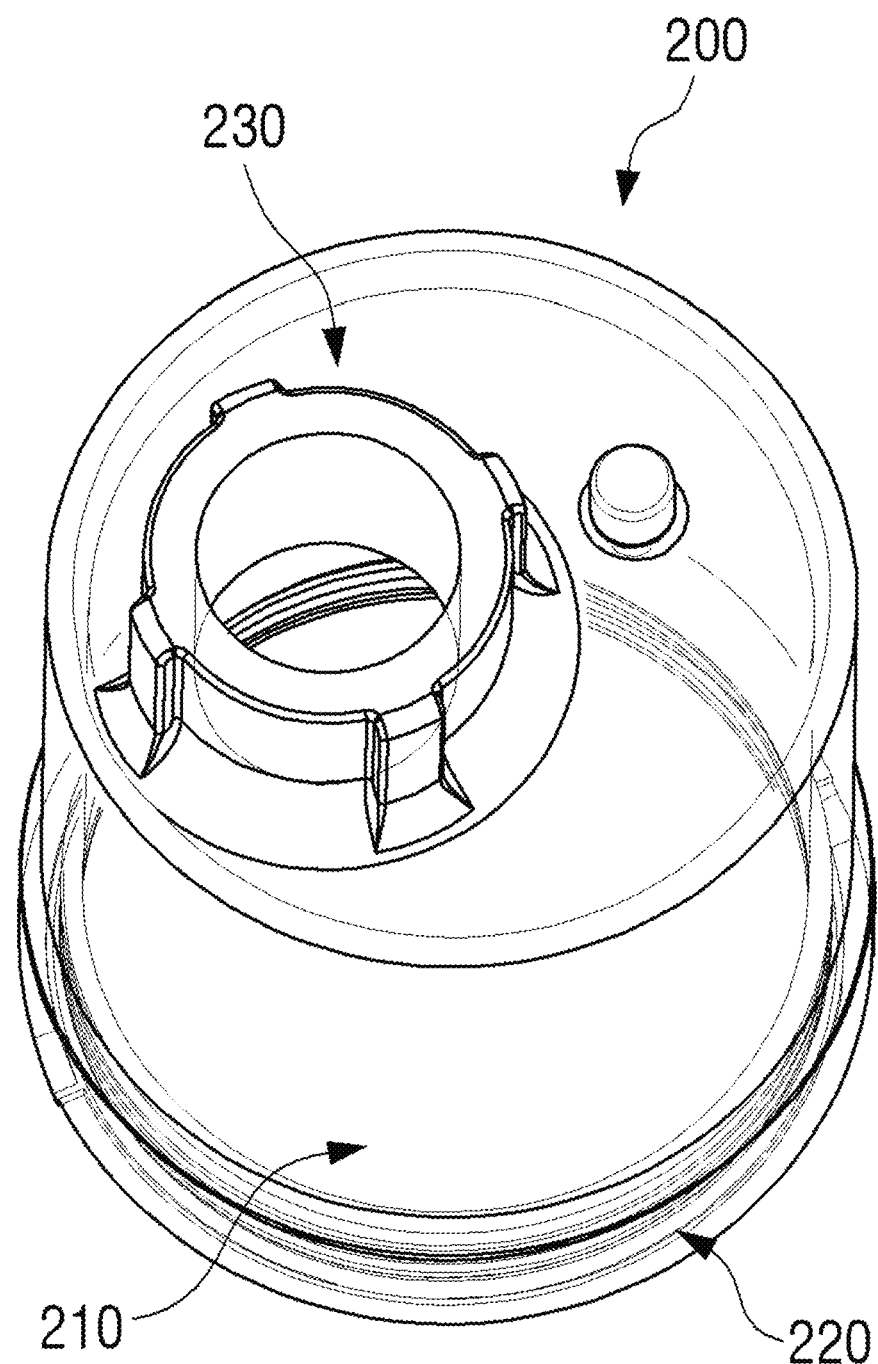
FIGS. 9 to 11 are views to illustrate an external body of the water detector of the double structure with the freeze protection function according to an embodiment of the present disclosure.
Figure 10:
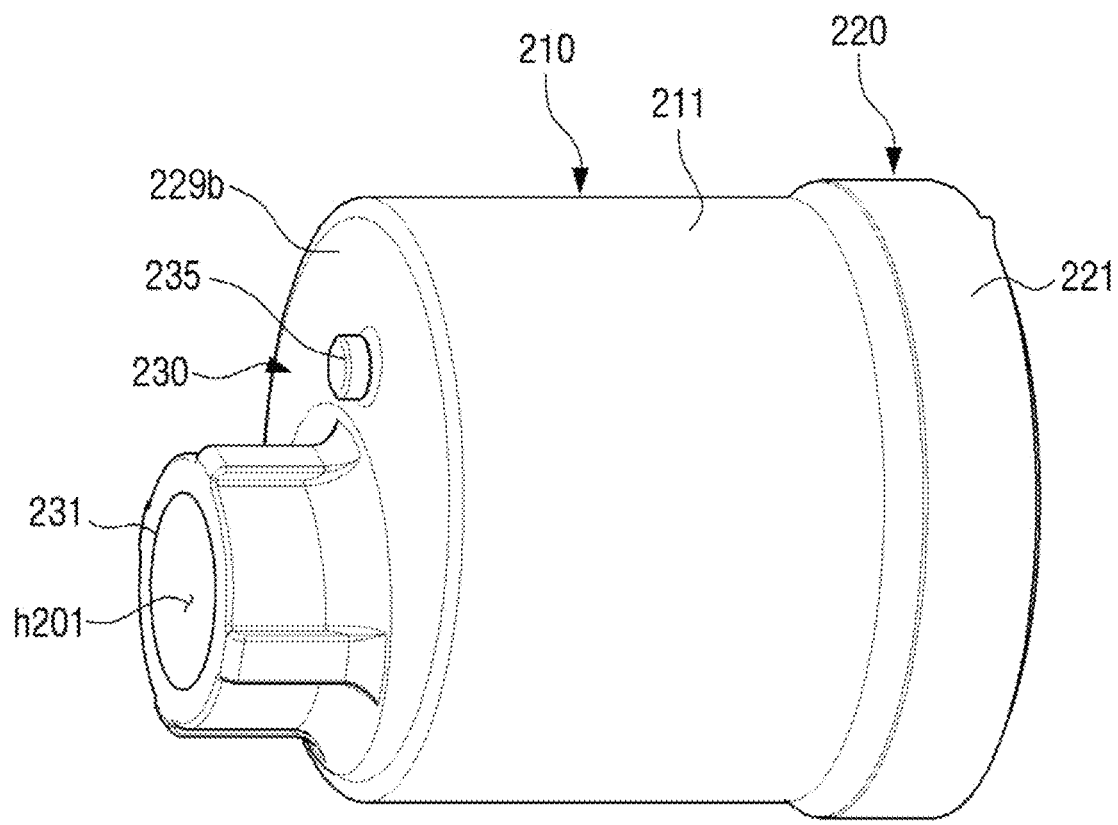
Figure 11:
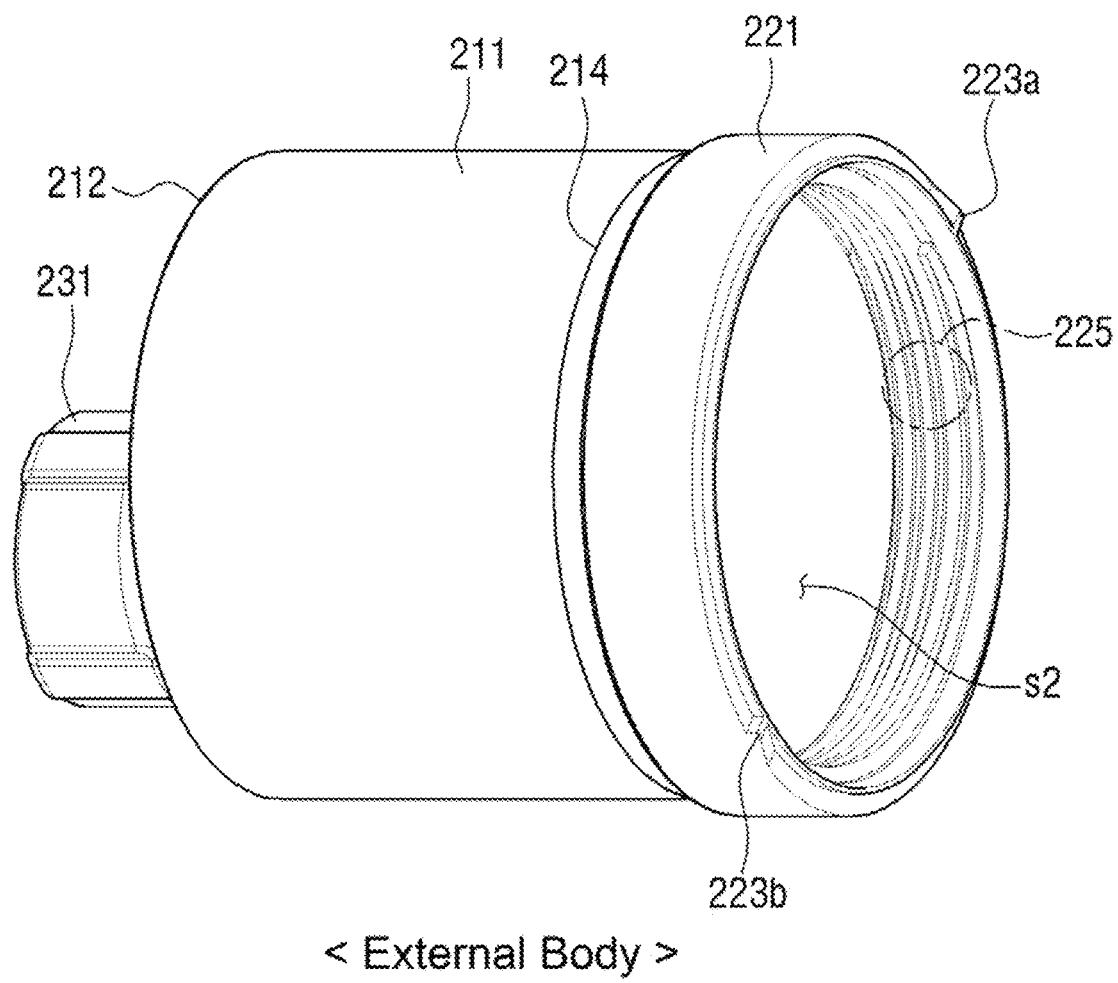

FIGS. 9 to 11 are views to illustrate the external body of the water detector of the double structure with the freeze protection function according to an embodiment. Hereinafter, the external body 200 will be described in detail with reference to FIGS. 9 to 11.

In an embodiment, the external body 200 may include a structure 210 (referred to as a "second structure 210" for convenience of explanation), a coupling portion 220 (referred to as a "second coupling portion 220" for convenience of explanation), and a casing portion 230 (referred to as a "second casing portion 230" for convenience of explanation).

The second structure 210 may have a container shape. An upper portion of the second structure 210 may be coupled to the second casing portion 230, and a lower portion of the second structure 210 may be coupled to the second coupling portion 220.

In an embodiment, the upper portion of the second structure 210 may be inserted into the inside of the second casing portion 230 and tightly coupled thereto.

The second structure 210 may be formed in a container shape, and may have an empty space formed in the inside s2 thereof, and may include a side surface portion 211, an upper portion 212, and a lower portion 214. The side surface portion 211, the upper portion 212, and the lower portion 214 of the second structure 210 may be integrally connected with one another.

According to an embodiment, the second structure 210 may be formed in a cylindrical shape.

The upper portion 212 of the second structure 210 may be tightly coupled with the second casing portion 230. As will be described below, a fluid may be drawn in or may be discharged through the hole h201 formed on the second casing portion 230. In an embodiment, the upper portion 212 of the second structure 210 may be inserted into the inside of the second casing portion 230 and tightly coupled thereto.

The lower portion 214 of the second structure 210 is opened and the internal body 100 is inserted into the opened space of the lower portion 214, such that the internal body 100 and the external body 200 are coupled to each other.

In an embodiment, a vent portion 235 may be formed on the casing portion 230 of the external body 200 to discharge gas to the outside. For example, the vent portion 235 may be configured to manually or automatically discharge gas existing in the water detector 10 to the outside. For example, when the vent portion 235 is configured to manually discharge, the vent portion 235 may be configured by a device like as a screw or a valve. When the vent portion 235 is configured by a screw, gas existing in the water detector 10 may be discharged to the outside by turning the screw in one direction. In another example, when the vent portion 235 is configured with a device like an on-off valve, gas existing in the water detector 10 may be discharged to the outside by turning on the valve. When the vent portion 235 is configured to automatically discharge, the vent portion 235 may be configured to automatically discharge gas in the water detector 10 to the outside when pressure in the water detector 10 is greater than or equal to a reference value (pre-defined value).

The second casing portion 230 may include a sealing portion 229 (229a, 229b) (hereinafter, referred to as a "second sealing portion 229" for convenience of explanation), and a fluid inflow and outflow portion 231 (hereinafter, referred to as a "second fluid inflow and outflow portion 231" for convenience of explanation) having the hole h201 formed thereon. The second sealing portion 229 may include an inner surface 229a and an outer surface 229b. The inner surface 229a is in contact with the inside s2, and the outer surface 229b is in contact with the outside.

The second sealing portion 229 is tightly coupled to the upper portion 212 of the second structure 210, and the second fluid inflow and outflow portion 231 is formed on a certain position of the sealing portion 229. The hole h201 provides a passage to allow the fluid to move between the inside of the water detector 10 (for example, the inside s1 of the internal body 100), and the outside of the water detector 10.

When the water detector 10 is coupled to the oil storage tank 20 in the vertical direction, the oil stored in the oil storage tank 20 flows into the water detector 10 through the second fluid inflow and outflow portion 231, and the oil flowing into the water detector 10 is discharged to the outside through the first fluid inflow and outflow portion 131.

On the other hand, when the water detector 10 is coupled to the oil storage tank 20 in the horizontal direction, the oil stored in the oil storage tank 20 flows into the water detector 10 through the first fluid inflow and outflow portion 131, and the oil flowing into the water detector 10 is discharged to the outside through the second fluid inflow and outflow portion 231.

When the second structure 210 is formed in a cylindrical shape, the second casing 230 may also be formed with a cap having a cylindrical shape. In this case, the second structure 210 may be coupled to the second casing portion 230 by being tightly inserted into the inside of the cylindrical second casing portion 230.

The lower portion 214 of the second structure 210 is integrally connected with the second coupling portion 220.

The second coupling portion 220 may include a locking portion 221 and a fastening portion 225. The locking portion 221 may have protrusions 223 (223a, 223b) formed thereon. In addition, the locking portion 221 may have a space formed thereon to be engaged with the O-ring 127.

In an embodiment, the fastening portion 225 may be formed on an inner surface of the locking portion 221, and the protrusions 223 (223a, 223b) may be formed on an end of the locking portion 221 (a portion being brought into contact with the first coupling portion 120 of the internal body 100). Each of the protrusions 223a, 223b may have a shape inclining and protruding. According to an embodiment, each of the protrusions 223a, 223b may protrude from a predetermined position of the locking portion 221 as long as a predetermined section with a certain slope, and may return to an original height of the locking portion 221 (that is, a height before protruding) after the predetermined section. For example, the protrusions 223a, 223b may be formed in a right triangle shape.

The locking portion 221 formed on the external body 200 may have a position and a configuration corresponding to those of the locking portion 121 formed on the internal body 100, and the locking portion 221 will be described below with reference to FIGS. 12 and 13.

The fastening portion 225 formed in the external body 200 is configured to be engaged with the fastening portion 125 formed on the internal body 100 and to be tightly coupled thereto. For example, the fastening portion 225 may have a crest and a root like the shape of a screw.

Figure 12:
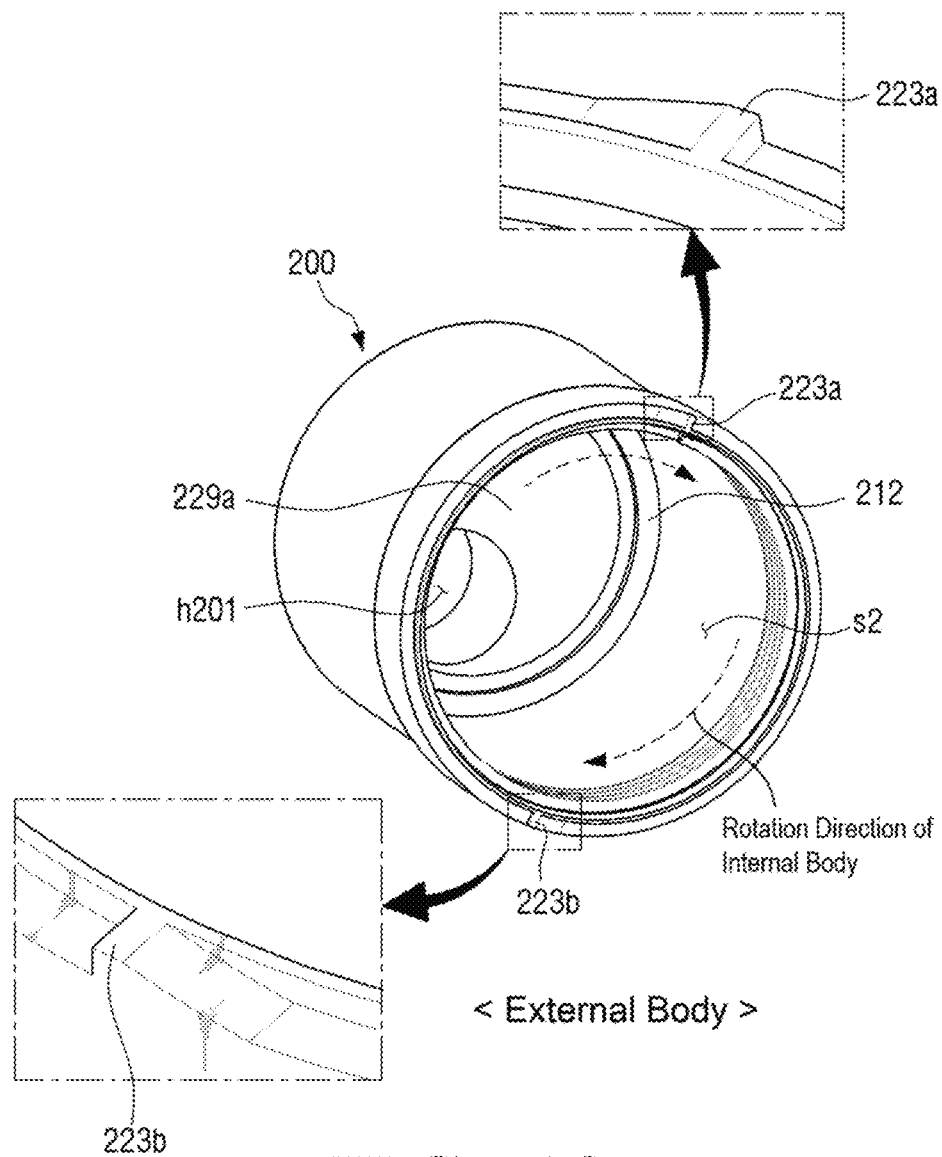
FIGS. 12 and 13 are views to illustrate a locking structure of the water detector of the double structure with the freeze protection function according to an embodiment of the present disclosure.
Figure 13:
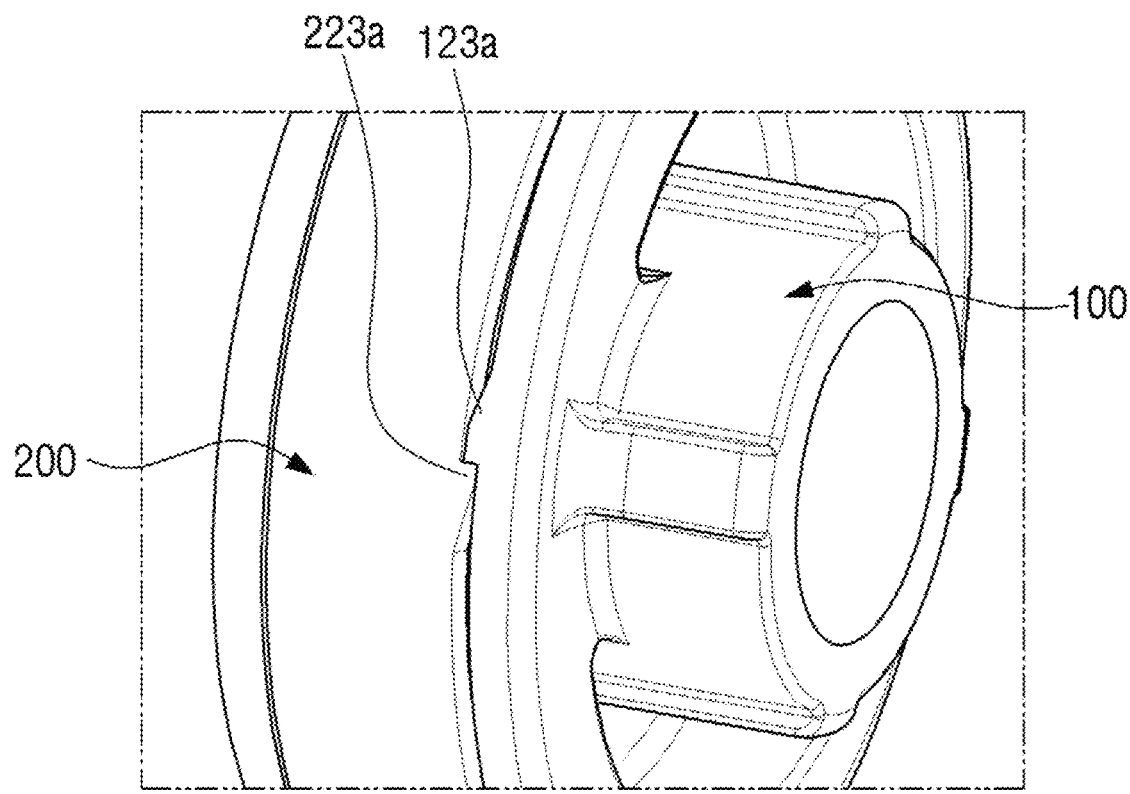

FIGS. 12 and 13 are views to illustrate a locking structure of the water detector of the double structure with the freeze protection function according to an embodiment.

FIG. 12 depicts a rotation direction in which the internal body 100 coupled with the protrusions of the external body 200 is rotated (that is, a clockwise direction on FIG. 12).

According to an embodiment, the internal body 100 is inserted into the external body 200 and is rotated in the clockwise direction (or the external body 200 is rotated in the counter clockwise direction), such that the external body 200 and the internal body 100 are coupled to each other.

As described above, each of the protrusions 223a, 223b formed on the locking portion 221 of the external body 200, and each of the protrusions 123a, 123b formed on the locking portion 121 of the internal body 100 may have a rectangular shape. The protrusions 223a, 223b and the protrusions 123a, 123b may have shapes symmetrical to each other.

Referring to FIGS. 12 and 13, when the internal body 100 is rotated in the clockwise direction, the protrusion 223b formed on the locking portion 221 of the external body 200 slides by the protrusion 123b formed on the locking portion 121 of the internal body 100 in contact therewith, and, when the protrusion 223b and the protrusion 123b slide by in contact with each other, the internal body 100 cannot be rotated in the counter clockwise direction. The protrusion 223a and the protrusion 123a are coupled to each in the same way, and the internal body 100 and the external body 200 are not unlocked from each other. That is, a locking structure is formed.

Figure 14:
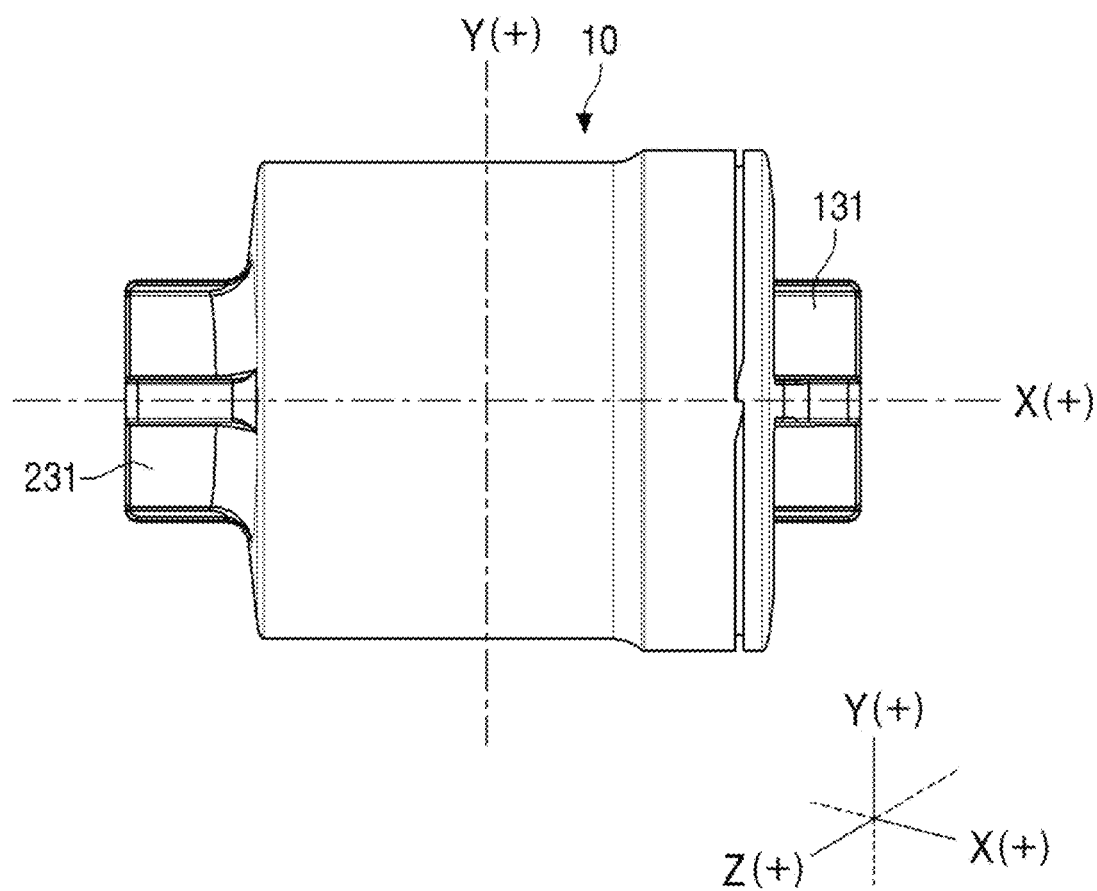
FIGS. 14 to 16 are views to illustrate an asymmetric structure of the water detector of the double structure with the freeze protection function according to an embodiment of the present disclosure.
Figure 15:
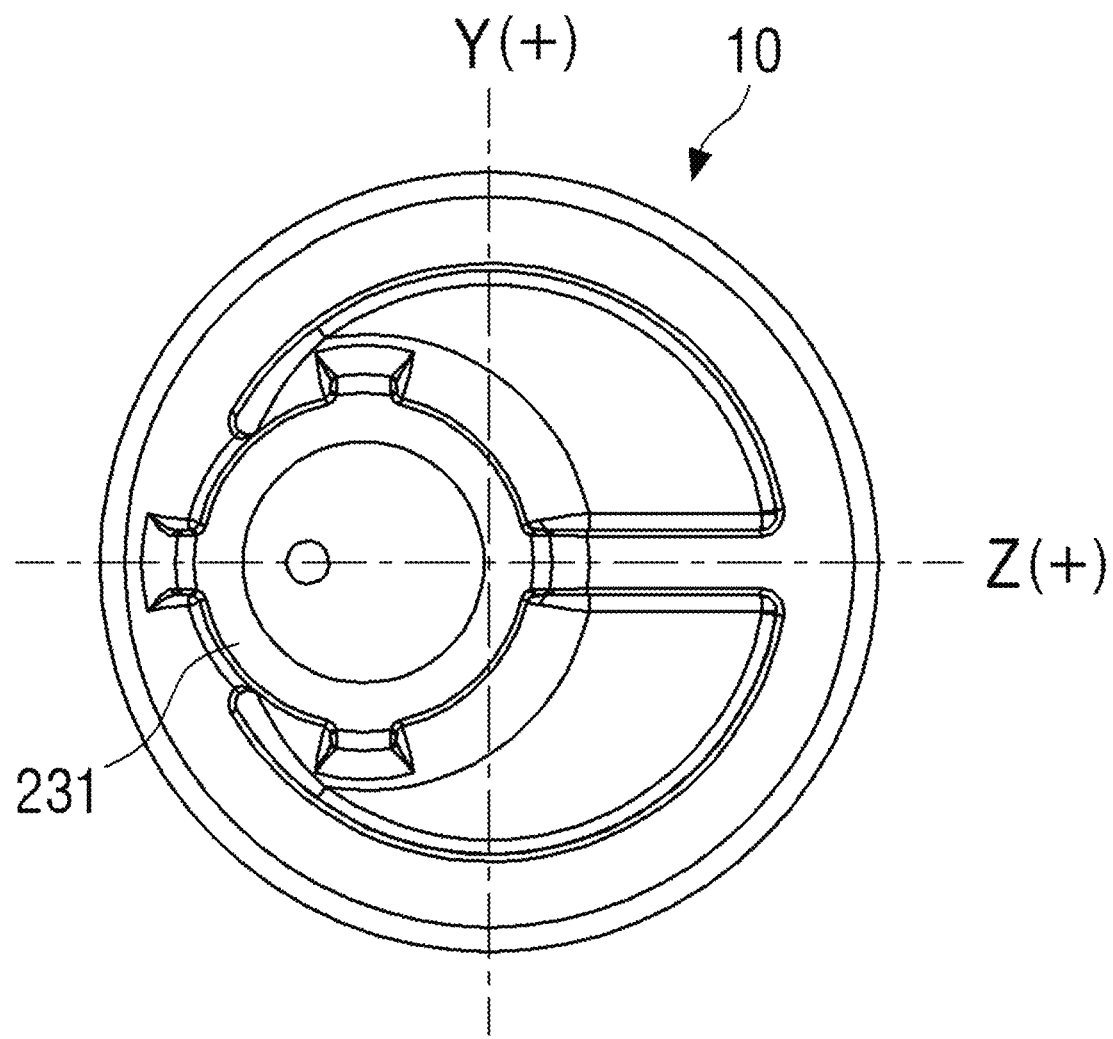
Figure 16:
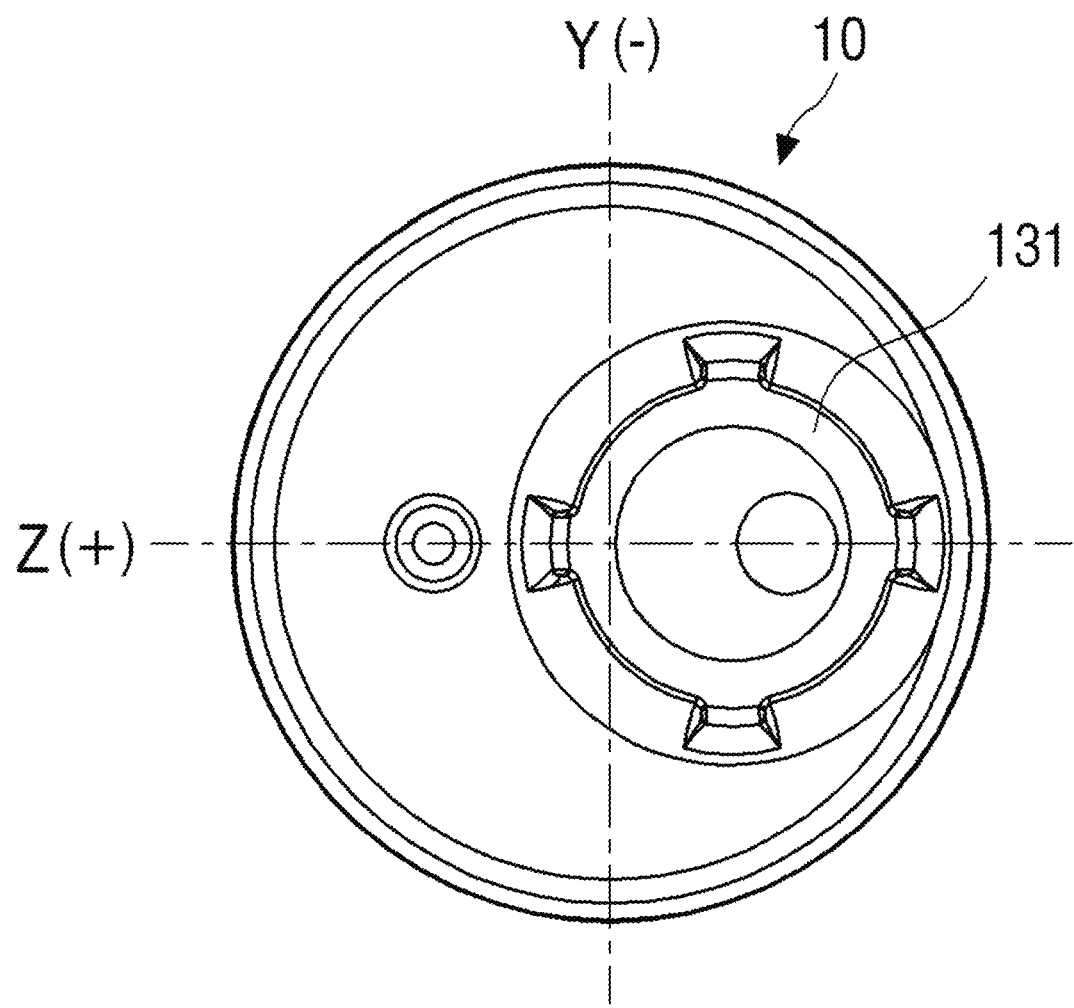

FIGS. 14 to 16 are views to illustrate an asymmetric structure of the water detector of the double structure with the freeze protection function according to an embodiment.

Referring to FIGS. 14 to 16, the first fluid inflow and outflow portion 131 of the internal body 100, and the second fluid inflow and outflow portion 231 of the external body 200 may be arranged on positions which are not symmetrical to each other. The first fluid inflow and outflow portion 131 and the second fluid inflow and outflow portion 231 may have the asymmetric structure in order for the water detector 10 to be used for both the horizontal coupling and the vertical coupling.

It is assumed that there are two virtual axes parallel to the ground surface. The two virtual axes are indicated by the X-axis and the Z-axis in FIGS. 14 to 16. Specifically, the X-axis is defined as an axis that penetrates through the center of the water detector 10 (for example, the center of the first structure 111) and is parallel to the longitudinal direction of the water detector 10, and the Z-axis is defined as an axis that passes through the center of the water detector 10 and intersects with the X-axis perpendicularly. The Y-axis is perpendicular to the X-axis and the Z-axis, and the X-axis, the Y-axis, and the Z-axis form an orthogonal coordinate system.

Referring to FIG. 15, it can be seen that the second fluid inflow and outflow portion 231 of the external body 200 deviates from the X-axis and is arranged on the left of the X-axis. Referring to FIG. 16, it can be seen that the first fluid inflow and outflow portion 131 of the internal body 100 deviates from the X-axis and is arranged on the right of the X-axis. That is, according to an embodiment, the first fluid inflow and outflow portion 131 and the second fluid inflow and outflow portion 231 are not arranged on the same axis.

The asymmetric structure of the water detector 10 refers to a structure in which the fluid inflow and outflow portion 231 of the external body 200 and the fluid inflow and outflow portion 131 of the internal body 100 are not arranged on the same virtual axis (hereinafter, referred to as a "reference axis") extending in the same direction as the longitudinal direction of the water detector 10.

The reference axis, that is, the virtual axis extending in the same direction as the longitudinal direction of the water detector 10, may be any one of the following axes:

a) an axis passing through the internal body 100 of the water detector 10 and parallel to the ground surface;

b) an axis passing through the inside of the internal body 100 of the water detector 10 and parallel to the side surface portion 111 (that is, an axis parallel to the longitudinal direction of the internal body 100); and c) an axis passing through the inside of the external body 200 of the water detector 10, and parallel to the side surface portion 211 (that is, an axis parallel to the longitudinal direction of the external body 200).

The asymmetric structure of the water detector 10 implies that the fluid inflow and outflow portion 231 is not positioned on a virtual axis which is defined as passing through the fluid inflow and outflow portion 131 and extending in the same direction as the longitudinal direction of the water detector 10, or the fluid inflow and outflow portion 131 is not positioned on an axis which is defined as passing through the fluid inflow and outflow portion 231 and extending in the same direction as the longitudinal direction of the water detector 10. Due to such a configuration, the water detector 10 according to the present disclosure can be used for both the vertical coupling (see FIG. 1) and the horizontal coupling (see FIG. 2) without changing the configuration.

The X-axis, the Y-axis, and the Z-axis described above with reference to FIGS. 14 to 16 are arbitrarily assumed for the purpose of explanation, and thus it will be understood by those skilled in the art that the present disclosure is not limited to these axes.

Figure 17:
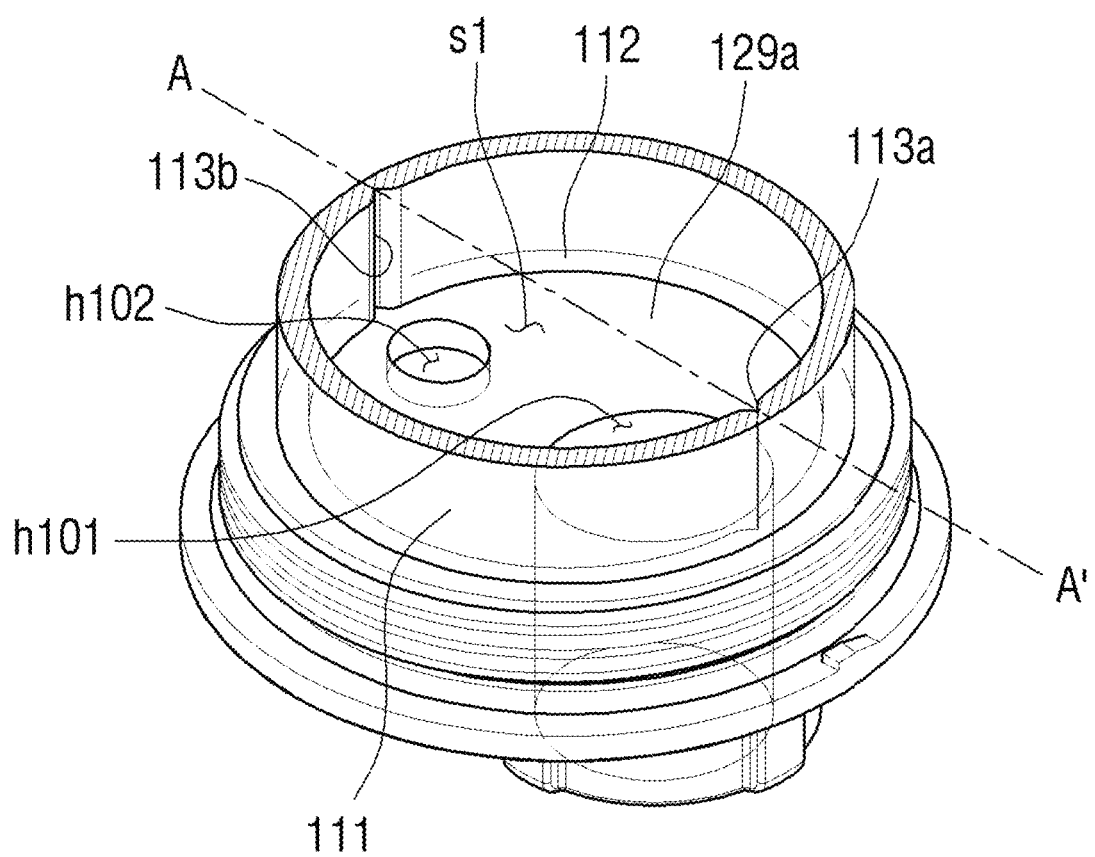
FIGS. 17 and 18 are views to illustrate a magnet provided in the water detector of the double structure with the freeze protection function according to an embodiment of the present disclosure.
Figure 18:
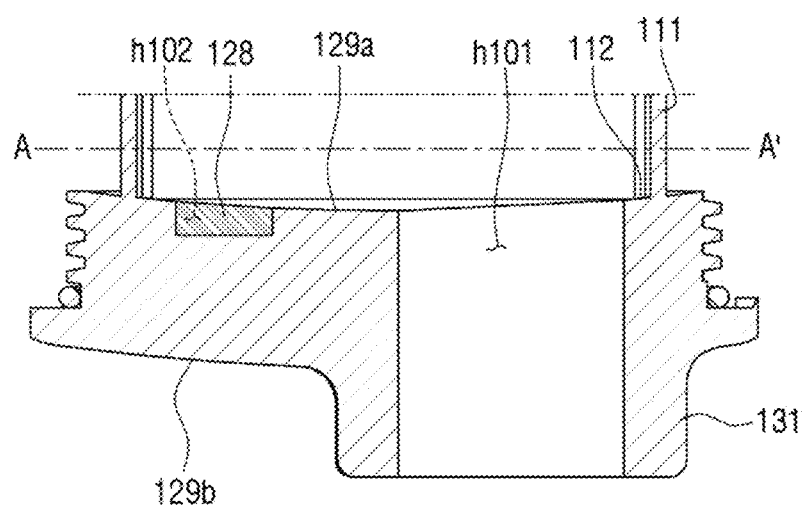

FIGS. 17 and 18 are views to illustrate a magnet provided in the water detector of the double structure with the freeze protection function according to an embodiment.

Referring to FIGS. 17 and 18, the internal body 100 of the water detector 10 of the double structure with the freeze protection function according to an embodiment includes a magnet for collecting metals contained in the fluid.

For example, the magnet may be coupled to an inner surface of the casing portion 130 of the internal body 100. Herein, the inner surface of the casing portion 130 refers to the inner surface 129a of the first sealing portion 129 (129a, 129b).

As described above with reference to the other drawings, the internal body 100 may include the first structure 110, the first coupling portion 120, and the first casing portion 130, and the first casing portion 130 may be coupled to the first structure 110, the first coupling portion 120 may be formed on the exterior of the outer circumference of the first casing portion 130, and the first structure 110 may be tightly coupled to the inside of the outer circumference of the first casing portion 130. In addition, the first casing portion 130 may include the first sealing portion 129 (129a, 129b) and the first inflow and outflow portion 131. Herein, a hole h102 may be formed on the inner surface 129a of the first sealing portion 129 (129a, 129b) to have the magnet 128 coupled thereto. In an embodiment, the inner surface 129a of the first sealing portion 129 (129a, 129b) may be inclined, and the fluid flowing into the water detector 10 can be easily discharged to the outside through the hole h101 due to the inclination.

The magnet 128 is not illustrated in the other drawings except for FIG. 18 for easy understanding of the hole h102 to which the magnet 128 is coupled, and it will be understood by those skilled in the art that only FIG. 18 depicts the magnet 128.

In the water detector 10 described with reference to FIGS. 1 to 18, a valve (not shown) which is removably coupled to the first fluid inflow and outflow portion 131 formed on the internal body 100, and a valve (not shown) which is removably coupled to the second fluid inflow and outflow portion 231 formed on the external body 200 have not been described. However, such valves may be easily configured by those skilled in the art, and may be used in the water detector 10 according to the present disclosure. For example, those skilled in the art may control the flow of a fluid flowing into or discharged from the water detector 10 by using an on-off valve.

Figure 19:
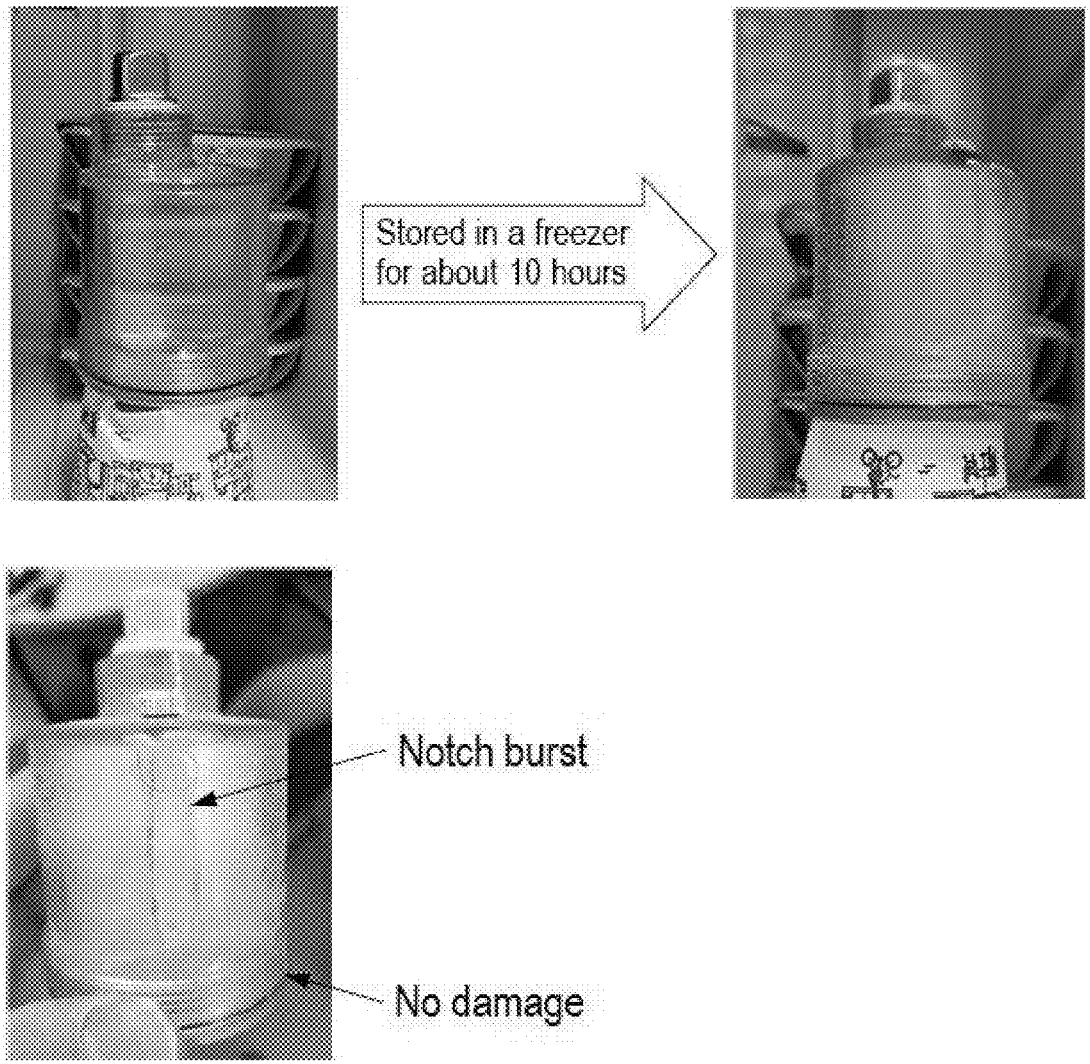
FIGS. 19 and 20 are views to illustrate technical effects of the water detector of the double structure with the freeze protection function according to an embodiment of the present disclosure.
Figure 20:
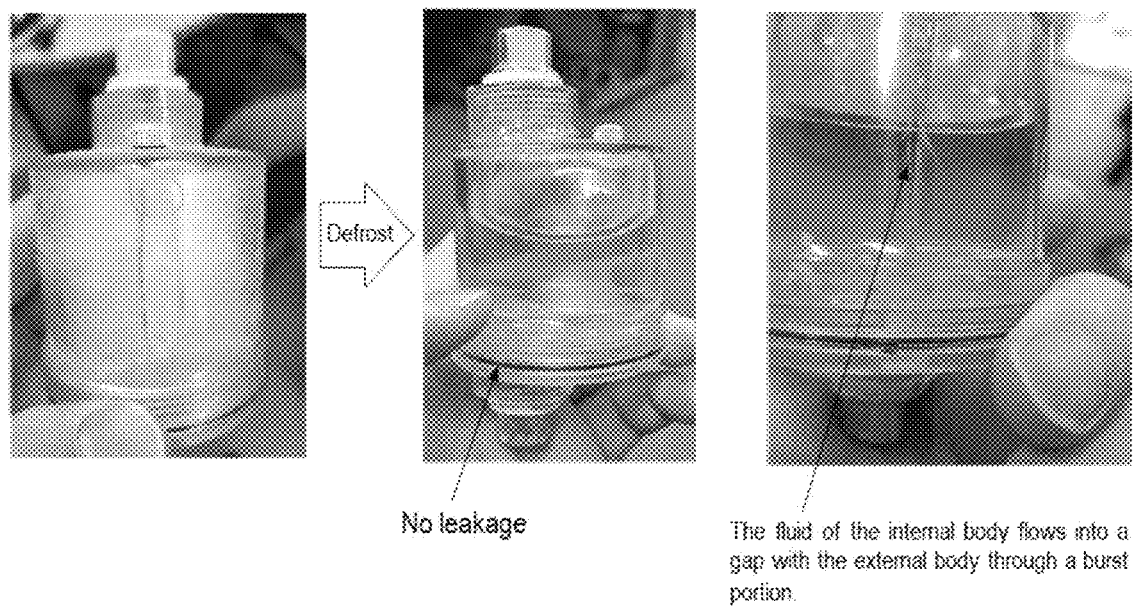

FIGS. 19 and 20 are views to illustrate technical effects that can be achieved by the water detector of the double structure with the freeze protection function according to an embodiment.

The inventor(s) made a test product of the water detector 10 of the double structure with the freeze protection function according to an embodiment to see the effect of freeze protection.

As shown in FIG. 19, the test product of the water detector 10 of the double structure with the freeze protection function according to an embodiment (hereinafter, the "test product") was filled with a fluid (water), and was stored in a freezer for about 10 hours. Then, it was checked whether the test product was damaged or not. As a result of checking, the test product was not damaged and only the notch formed on the test product was damaged.

As shown in FIG. 20, the test product stored in the freezer in FIG. 19 was defrosted, and it was checked that there was no leakage of the fluid filling the test product, and only the notch formed on the internal body was damaged, and the fluid stored in the internal body flowed to a space between the external body and the internal body through a damaged portion.

According to the result of the experiment of the test product of the water detector, it could be seen that only the notch formed on the internal body was damaged and the whole damage of the internal body was prevented, and also, the external body was prevented from being damaged due to an increasing volume of the internal body, thanks to the presence of the space between the internal body and the external body.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A water detector of a double structure with a freeze protection function, the water detector comprising:
an external body comprising a container-shaped structure which has an empty space formed therein, and comprises a side surface portion, an upper portion, and a lower portion; and
an internal body which is inserted into an inside of the external body and coupled thereto, the internal body comprising a container-shaped structure which has an empty space formed therein, and comprises a side surface portion, an upper portion, and a lower portion,
wherein the lower portion of the structure of the external body and the lower portion of the structure of the internal body are opened, respectively,
wherein a casing portion having a fluid inflow and outflow portion formed thereon to allow a fluid to be drawn in from the outside or to be discharged to the outside is coupled to the upper portion of the structure of the external body, and a casing portion having a fluid inflow and outflow portion formed thereon to allow a fluid to be drawn in from the outside or to be discharged to the outside is coupled to the upper portion of the internal body,
wherein the lower portion of the structure of the internal body is inserted into the lower portion of the structure of the external body and coupled thereto.

2. The water detector of claim 1, wherein the structure of the internal body and the structure of the external body are spaced apart from each other by a predetermined distance.

3. The water detector of claim 1, wherein the internal body and the external body are formed with a transparent material, such that interiors of the internal body and the external body are seen from the outside.

4. The water detector of claim 1, wherein a vent portion is formed on the casing portion of the external body to discharge a gas to the outside.

5. The water detector of claim 1, wherein a magnet is coupled to an inner surface of the casing portion of the internal body.

6. The water detector of claim 1, wherein a notch is formed on an inner surface of the side surface portion of the internal body.

7. The water detector of claim 1, wherein the internal body and the external body are coupled to each other by means of a locking structure for preventing unlocking.

8. The water detector of claim 7, wherein the internal body further comprises a coupling portion, the coupling portion being formed on an exterior of the casing portion of the internal body, and
wherein the external body further comprises a coupling portion, the coupling portion being coupled to the lower portion of the structure of the external body, and
wherein a protrusion formed on the coupling portion of the internal body, and a protrusion formed on the coupling portion of the external body are coupled to each other, thereby forming a locking structure.

9. The water detector of claim 1, wherein the fluid inflow and outflow portion of the external body is configured not to be positioned on a virtual axis which is defined as passing through the fluid inflow and outflow portion of the internal body and extending in a same direction as a longitudinal direction of the water detector, or the fluid inflow and outflow portion of the internal body is configured not to be positioned on a virtual axis which is defined as passing through the fluid inflow and outflow portion of the external body and extending in the same direction as the longitudinal direction of the water detector.

10. The water detector of claim 1, wherein the structure of the external body and the structure of the internal body are formed with copolyester, respectively.

\* \* \* \* \*